(12) United States Patent
Johnson

(10) Patent No.: US 11,272,692 B2
(45) Date of Patent: Mar. 15, 2022

(54) POULTRY FEED DEVICE

(71) Applicant: Leif Johnson, Greenbank, WA (US)

(72) Inventor: Leif Johnson, Greenbank, WA (US)

( * ) Notice: Subject to any disclaimer, the term of this patent is extended or adjusted under 35 U.S.C. 154(b) by 39 days.

(21) Appl. No.: 16/292,082

(22) Filed: Mar. 4, 2019

(65) Prior Publication Data
US 2019/0269103 A1 Sep. 5, 2019

Related U.S. Application Data

(60) Provisional application No. 62/637,975, filed on Mar. 2, 2018.

(51) Int. Cl.
*A01K 39/01* (2006.01)

(52) U.S. Cl.
CPC .................................. *A01K 39/01* (2013.01)

(58) Field of Classification Search
CPC .... A01K 39/01; A01K 39/00; A01K 39/0113; A01K 39/012
See application file for complete search history.

(56) References Cited

U.S. PATENT DOCUMENTS

| | | | | |
|---|---|---|---|---|
| 2,890,681 | A * | 6/1959 | Sack | A01K 39/0113 119/52.4 |
| 2,896,575 | A * | 7/1959 | Scruggs | A01K 39/0113 119/57.9 |
| D335,724 | S * | 5/1993 | Coffer | D30/110 |
| 8,459,206 | B1 * | 6/2013 | Colvin | A01K 39/01 119/57.8 |
| 10,188,081 | B1 * | 1/2019 | Wood | A01K 39/01 |
| 2007/0227453 | A1 * | 10/2007 | Puckett | A01K 39/012 119/57.8 |
| 2017/0231202 | A1 * | 8/2017 | Cote | A01K 31/12 119/57.8 |

FOREIGN PATENT DOCUMENTS

GB 2499453 A * 8/2013 ............. A01K 39/01

OTHER PUBLICATIONS

Amazon, Rugged Ranch High End Hen Poultry Feeder [date accessed Jan. 15, 2018]: https://www.amazon.com/dp/B01N4I5PTZ/ref=asc_df_B01N4I5PTZ5336185/?tag=hyprod-20&creative=395033&creativeASIN=B01N4I5PTZ&linkCode=df0&hvadid=198092149912&hvpos=1o4&hvnetw=g&hvrand=13190444084027200054&hvpone=&hvptwo=&hvqmt=&hvdev=c&hvdvcmdl=&hvlocint=&hvlocphy=9033378&hvtargid=pla-353405853067.

Amazon, Royal Rooster Chicken Feeder with Rain Cover and Valve-Cup Waterer Set—6.5 lbs/1 gal. [date accessed Jan. 15, 2018]: https://www.amazon.com/dp/B014XCZBPY/ref=asc_df_B014XCZBPY5336185/?tag=hyprod-20&creative=395033&creativeASIN=B014XCZBPY&linkCode=df0&hvadid=167128818228&hvpos=1o2&hvnetw=g&hvrand=13190444084027200054&hvpone=&hvptwo=&hvqmt=&hvdev=c&hvdvcmdl=&hvlocint=&hvlocphy=9033378&hvtargid=pla-310149413981.

\* cited by examiner

*Primary Examiner* — Kristen C Hayes
(74) *Attorney, Agent, or Firm* — Christopher Mayle; Bold IP, PLLC

(57) ABSTRACT

Embodiments for a poultry feed device are provided. The device includes at least one baffle having an outer hood cover, an inner hood cover, and an outer shield. In some embodiments, the device is capable of connecting to a bucket, allowing poultry to access feed through the device.

5 Claims, 3 Drawing Sheets

POULTRY FEED DEVICE

CROSS-REFERENCE TO RELATED APPLICATIONS

This application claims priority to U.S. Provisional Application No. 62/637,975 filed Mar. 2, 2018, which is incorporated by reference in its entirety

FIELD OF THE DISCLOSURE

This disclosure relates generally to the field of livestock feed devices. More specifically, this disclosure relates to a poultry feed device.

BACKGROUND

Currently there are a number of solutions for poultry feed devices. Some of these solutions include narrow cylindrical tubes with a rain cover over a feed tray at the bottom of the tubes. Some of these tubes can be set on the ground while others require the support of a wall, fence, or gate.

However, during the use of the above-mentioned poultry feed devices, poultry are often able to contaminate their feed with feces and often waste their feed by spilling it out of the devices.

Due to all of the existing shortcoming in presently available poultry feed devices, there is a need for a device that solves the present problems in the prior art.

SUMMARY

The disclosure presented herein relates to a poultry feed device. In one, non-limiting embodiment, the device may include at least one baffle with coupling means, an outer hood shield, an inner hood shield defining a chamber, and an outer shield defining an aperture which communicates with the chamber, at least one bolt, and a coupling nut.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
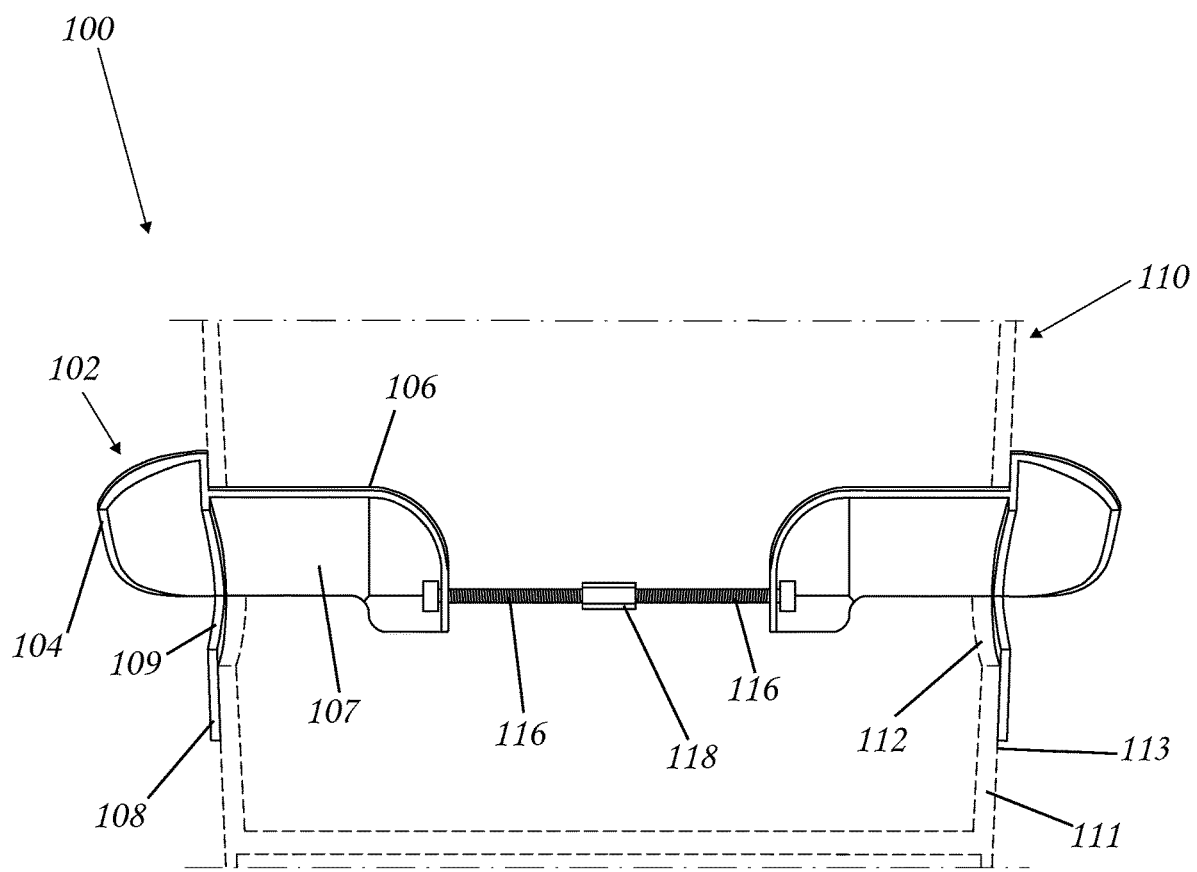
FIG. 1 is a cross-sectional view depicting a feed device according to one embodiment, with a portion of the feed device being depicted in side elevation, and with the device depicted in association with a portion of a poultry feed container, shown in dashed lines.

In the Summary above, this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and the upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Figure 2:
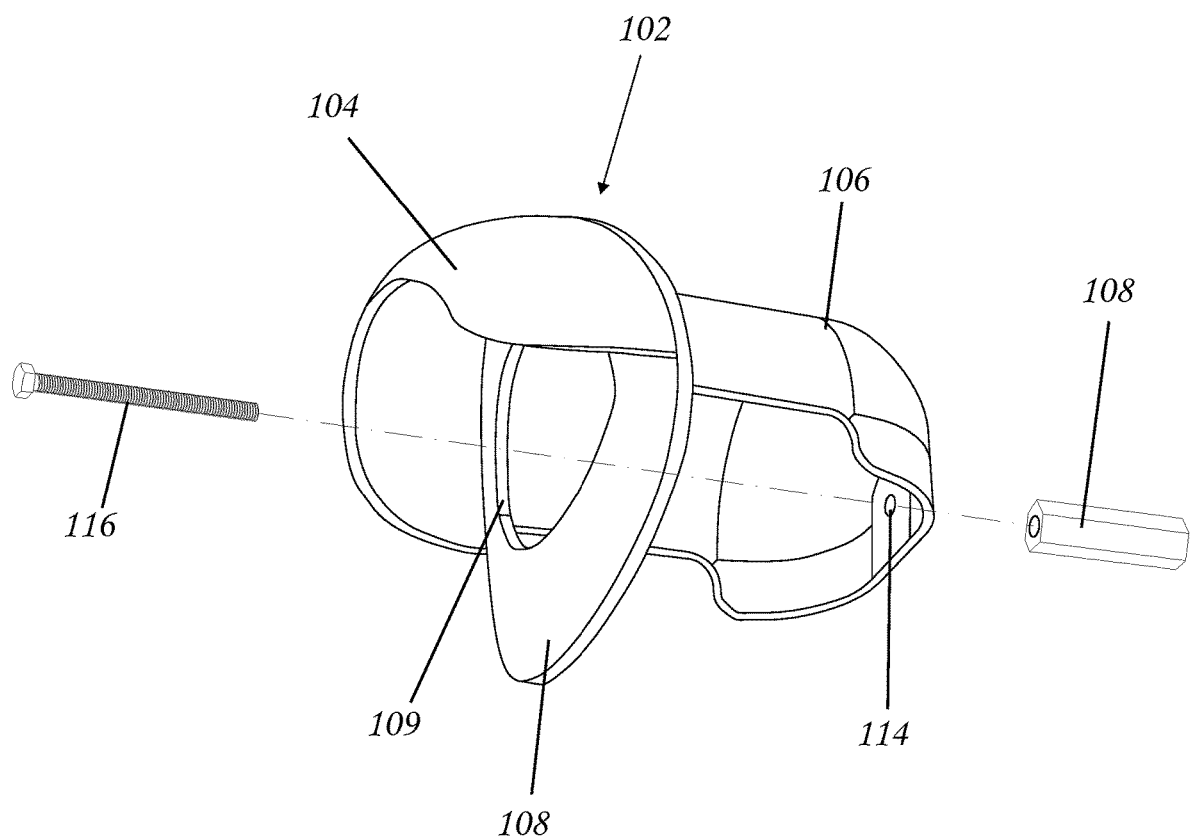
FIG. 2 is a perspective view depicting one of a pair of baffles of the feed device of FIG. 1.
Figure 3:
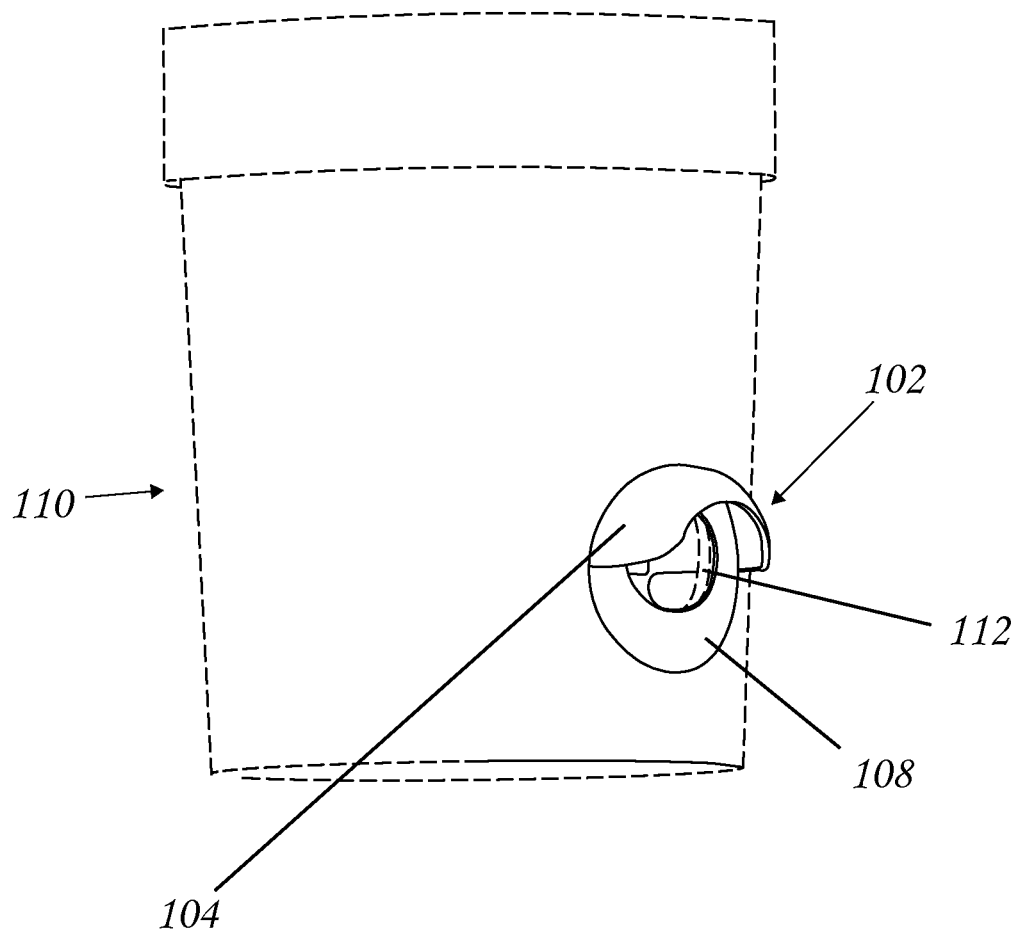
FIG. 3 is a perspective view depicting a portion of the feed device of FIG. 1, with the feed device installed on a poultry feed container, which is shown in dashed lines.

FIGS. 1-3 illustrate a poultry feed device 100 according to one embodiment.

FIG. 1 is a cross-sectional view depicting a poultry feed device 100 according to one embodiment, with a portion of the feed device being depicted in side elevation, and with the device depicted in association with a portion of a poultry feed container 110, shown in dashed lines.

The poultry feed device 100 can include at least one baffle 102 that can be attached to a poultry feed container 110. Each baffle 102 can include an outer hood cover 104, an inner hood cover 106, and an outer shield 108. Each of the outer hood cover 104 and the inner hood cover 106 have a dome shape, as shown in FIGS. 1 and 2. In one embodiment, each of the outer hood cover 104 and inner hood cover 106 can have rectangular shapes or box shapes. Further, the inner hood cover 106 may also define a chamber 107. In some embodiments, the outer shield 108 may also define an aperture 109 and the aperture 109 may be large enough to allow a poultry including chickens, turkeys, ducks, and geese to stick its head through the aperture and consume feed located in said feed container 110. The baffles 102 can be arranged such that the outer hood cover 104 and inner hood cover 106 are both attached to the outer shield 108. The outer shield 108 can define an aperture 109 which communicates with the chamber 107 defined by the inner hood shield 106.

In one or more embodiments, the poultry feed container ("container") 110 can be a standard five-gallon bucket. The container 110 can define at least one aperture 112 (also shown in FIG. 3) in a side wall 111 of the container 110 which may be used to secure the at least one baffle 102 to the container 110. Each baffle 102 may be secured by inserting the inner hood cover 106 of the respective baffle 102 through a corresponding one of the apertures 112 of the container 110. In some embodiments, the container 110 may define two apertures 112 opposite one another. Further, both apertures 112 are aligned and may receive a baffle 100 so that each baffle 100 can be positioned directly opposite the other. In some embodiments, a bolt 116 may be inserted through an aperture 114 defined by the inner hood cover 108 of both baffles 102 such that each bolt 116 terminates towards the center of the container 110. In some embodiments, a coupling nut 118 may be fastened to each bolt 116 at the bolt ends which terminate towards the center of the container 110, or the rear end of the inner hood cover 106. Additionally, the coupling nut 118 may be twisted to tighten and shorten the distance between each bolt 108, which can force the outer shield 108 to press against an outer surface 113 of the side wall 111 of the container 110 and form a seal around the apertures 112 of the container 110. This configuration allows poultry and other livestock consume fresh feed that is free of contaminants or moisture. By closing the top of the container 110 with, for example, a lid, the feed is protected from weather and contaminants.

Referring to FIG. 2, a perspective view of the invention is depicted according to embodiments of the present invention. In one or more embodiments, a baffle 102 may be one solid piece of plastic or metal with a unibody design such that an outer hood cover 104, inner hood cover 106, and outer shield 108 are all made from one piece of material. In other embodiments, the outer hood cover 104 and the inner hood cover 106 may be attached to the outer shield 108 by welding or similar methods common in the art, or adhered together with an adhesive. In one or more embodiments, the baffle 102 may be fastened to a container 110 which defines an aperture 112 by inserting the inner hood cover 108 through the aperture 112. The inner hood cover 108 may define an aperture 114 and a bolt 116 may be inserted through the aperture 114. Once the inner hood cover 106 is inserted through an aperture 112 defined by the container 110, a coupling nut 118 may be fastened to the bolt 116, which is inserted through the aperture 114 on the inner hood cover 104. In some embodiments, the coupling nut 118 may receive a second bolt 116 to connect to a second baffle 102 inserted through a second aperture 112 on a container 110 opposite and in line with the first baffle 102. Tightening the coupling nut 118 would decrease the distance between the two bolts 116 which allows the outer shield 108 to form a seal against the wall 113 of a container 110. In other embodiments, the coupling nut 118 may be outside the container and receive a bolt 116 that goes through an aperture 114 defined by an inner hood cover 106 and also through a separate aperture (not shown) defined by a container 110 opposite the baffle 102. Additionally, the coupling nut 118 may be tightened from outside the container 110 so that only one baffle 102 is needed.

In one or more embodiments, the outer shield 108 may have a curved surface to match the surface of a container 110 such as a five gallon bucket. In other embodiments, the outer shield 108 may have a flat surface to match the surface of a container with flat walls rather than curved walls. In some embodiments, the outer shield 108 may have padding or cushioning to create a tighter seal around an aperture or opening on the wall of a feed container. In other embodiments, the inner hood cover 106 may have exterior wedge barbs (not shown) behind the outer shield 108 and on the inner hood cover 106. The barbs can be placed apart from the outer shield 108 on the inner hood cover 106 and may be used to fasten the baffle 102 in place. The wedge barbs prevent the baffle 102 from slipping out of the aperture 109 of the wall 111 of a container 110.

Referring now to FIG. 3, a perspective view of the baffle 100 is depicted according to FIG. 1. In one or more embodiment, the baffle 102 is inserted into a container 110 defining an aperture 112 on the wall 111 of the container 110. The outer shield 108, in one or more embodiments, has a larger surface area than the aperture 112 on the container 110 such that it prevents the baffle 102 from falling completely through the aperture 112. The outer shield 108 presses against the wall 111 of the container 110 and creates a seal around the aperture 112 of the wall 111 of the container 110 when fully secured in place by a coupling system (not shown).

While alternate embodiments have been illustrated and described, as noted above, many changes can be made without departing from the spirit and scope of the POULTRY FEED DEVICE. Accordingly, the scope of the POULTRY FEED DEVICE is not limited by the disclosure of these preferred and alternate embodiments. Instead, the scope of the invention title be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶6.

What is claimed is:

1. A poultry feed device, the poultry feed device comprising:
   at least one baffle, wherein the at least one baffle further comprises:
      an outer hood cover;
      an inner hood cover; and
      an outer shield, that is shaped to keep poultry from flicking feed out of a container;
   wherein said outer shield defines an aperture configured to allow the poultry to stick its head through into the container, wherein the at least one baffle is positioned on a first part of a container wherein a first bolt is positioned through an aperture on the inner hood cover of the at least one baffle and an aperture on the first part of the container, the first bolt positioned through a second aperture on the container opposite of the aperture on the first part of the container, wherein the first bolt is secured to a coupling nut positioned outside of the container, wherein when the coupling nut is moved from a first position to a second position, the at least one baffle is tightened to the container.

2. The poultry feed device of claim 1, wherein the outer hood cover has a dome shape.

3. The poultry feed device of claim 1, wherein the inner hood cover defines an elongated chamber aperture.

4. The poultry feed device of claim 1, wherein said poultry feed device has a first baffle and a second baffle.

5. A poultry feed device that eliminates opportunity for poultry to scratch feed out, the poultry feed device comprising:
    a first baffle and a second baffle, wherein the first baffle and the second baffle further comprises:
        an outer hood cover;
        an inner hood cover; and
        an outer shield;
    wherein said outer shield defines an aperture configured to allow the poultry to stick its head through, wherein the first baffle is positioned on a first part of a container and the second baffle is positioned on a second part of the container, the second part positioned opposite of the first part, wherein a first bolt is positioned through an aperture in the inner hood cover of the first baffle and an aperture on the first part of the container and wherein a second bolt is positioned through a second aperture in the inner hood cover of the second baffle and an aperture on the second part of the container, the first bolt and the second bolt connected by a coupling nut positioned inside of the container, the coupling nut moved from a first position to a second position to decrease a distance between the first bolt and the second bolt.

* * * * *